(12) United States Patent
Voeller et al.

(10) Patent No.: US 6,799,376 B1
(45) Date of Patent: Oct. 5, 2004

(54) METHOD AND APPARATUS FOR WHEEL ALIGNMENT ADJUSTMENT

(75) Inventors: David A. Voeller, St. Louis, MO (US); Scott Hillman, Granite City, IL (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 10/729,055

(22) Filed: Dec. 5, 2003

Related U.S. Application Data

(63) Continuation of application No. 09/881,403, filed on Jun. 14, 2001, now Pat. No. 6,684,516.

(51) Int. Cl.[7] .................................................. G01B 5/24
(52) U.S. Cl. ........................ 33/203.18; 33/203; 33/288; 356/155; 702/151
(58) Field of Search .............................. 33/203, 203.18, 33/203.19, 203.2, 203.15, 203.16, 288; 356/139.09, 155; 702/94, 95, 150, 151, 152, 153, 183, 33, 34, 36, 40

(56) References Cited

U.S. PATENT DOCUMENTS

| | | | | |
|---|---|---|---|---|
| 4,176,463 A | * | 12/1979 | Ringle ..................... 33/203.18 |
| 4,381,548 A | * | 4/1983 | Grossman et al. ............ 33/288 |
| 4,453,315 A | * | 6/1984 | Mosiman et al. ........ 33/203.18 |
| 4,651,431 A | * | 3/1987 | Mieling .................. 33/203.18 |
| 4,782,596 A | * | 11/1988 | Mieling .................. 33/203.18 |
| 4,879,670 A | * | 11/1989 | Colarelli, III ............ 33/203.18 |
| RE33,144 E | * | 1/1990 | Hunter et al. .......... 356/139.09 |
| 5,033,198 A | * | 7/1991 | Hastings ................. 33/203.18 |
| 5,168,632 A | * | 12/1992 | Rimlinger, Jr. .............. 33/288 |
| 5,242,202 A | * | 9/1993 | Ettinger .................. 33/203.18 |
| 5,311,668 A | * | 5/1994 | Longa et al. ............ 33/203.18 |
| 5,471,754 A | * | 12/1995 | Mieling .................. 33/203.18 |
| 5,531,030 A | * | 7/1996 | Dale, Jr. ...................... 33/203 |
| 5,535,522 A | * | 7/1996 | Jackson ....................... 33/288 |
| 5,598,357 A | * | 1/1997 | Colarelli et al. ............ 700/279 |
| 5,625,953 A | * | 5/1997 | Healy et al. ............. 33/203.18 |
| 5,675,515 A | * | 10/1997 | January ................. 356/139.09 |
| 5,870,315 A | * | 2/1999 | January ...................... 700/279 |
| 6,064,927 A | * | 5/2000 | Molbach et al. ......... 33/203.18 |
| 6,313,911 B1 | * | 11/2001 | Stieff .................... 356/139.09 |
| 6,327,548 B1 | * | 12/2001 | Healy ......................... 702/151 |
| 6,427,346 B1 | * | 8/2002 | Stieff et al. .................. 33/203 |
| 6,684,516 B2 | * | 2/2004 | Voeller et al. ........... 33/203.18 |

* cited by examiner

Primary Examiner—Christopher W. Fulton
Assistant Examiner—Madeline Gonzalez
(74) Attorney, Agent, or Firm—Polster, Lieder, Woodruff & Lucchesi, L.C.

(57) ABSTRACT

A wheel alignment adjustment system includes sensing apparatus for sensing alignment characteristics of a vehicle to be aligned, and a memory for storing alignment specifications for a plurality of vehicles and alignment adjustment parts. A fixture is provided to secure the sensing apparatus to a wheel hub of the vehicle upon removal of the vehicle wheel rim and tire assembly, and a logic circuit is provided to determine, from sensed alignment characteristics, and corresponding alignment specifications, an adjustment to alter the vehicle alignment characteristics. A display is also included for displaying to a user a representation of the determined alignment. The fixture is configured for attachment to a vehicle wheel hub following removal of a vehicle wheel rim and tire assembly, and provides a mounting to which a wheel alignment sensor or wheel alignment target may be secured, thereby permitting measurement of the vehicle wheel alignment parameters directly from the position and orientation of the vehicle wheel hub.

8 Claims, 14 Drawing Sheets

METHOD AND APPARATUS FOR WHEEL ALIGNMENT ADJUSTMENT

CROSS-REFERENCE TO RELATED APPLICATIONS

"This application is a continuation of, and claims priority from, U.S. patent application Ser. No. 09/881,403, now U.S. Pat. No. 6,684,516 filed on Jun. 14, 2001, and published as U.S. Patent Application Publication No. 2002/0189114 A1 on Dec. 19, 2002".

STATEMENT REGARDING FEDERALLY SPONSORED RESEARCH OR DEVELOPMENT

Not Applicable.

BACKGROUND OF THE INVENTION

The present invention relates to vehicle wheel alignment and more particularly, to an improved system for installing alignment adjustment components, such as cams, wedges, adjustable ball joints, and upper strut mounting plates which are used to adjust toe, caster, and camber alignment angles, and which usually require removal and reinstallation of a vehicle wheel rim and tire assembly.

As is well known in the automotive industry, some automotive vehicles utilize a cam bolt installed in a two-bolt strut to adjust the camber orientation of the automotive vehicle. The amount of adjustment and the orientation of this cam bolt primarily determines the amount of change in camber, but may also affect caster depending upon how the strut is mounted to the vehicle frame. A separate cam bolt is required for each vehicle wheel rim and tire assembly. It is also well known to use various wedges to adjust the camber of a particular wheel rim and tire assembly. Camber adjustment wedges come in various types, each having different sizes and configurations. Similarly, adjustable ball joints and upper strut mounting plates are used to offset camber and caster, and are available in a variety of sizes and configurations, each providing a varying degree of adjustment.

In order to utilize cam bolts, wedges, adjustable ball joints and upper strut mounting plates, an alignment technician is usually required to remove the vehicle wheel rim and tire assembly for installation of these parts. For cam bolts utilized to change a vehicle's camber alignment angle only, the orientation of the cam bolt in the two-bolt strut regulates the amount of camber change. These cam bolts may be installed in such a position so as to result in a near zero error in camber, as compared to specifications. Most of these cam bolt installations require the alignment technician to remove the vehicle wheel rim and tire assembly in order to replace existing attachment bolts with the cam bolts. During this process, it is a common practice in the industry today to use a magnetic camber gauge, configured to measure only the camber alignment angle, attached to the vehicle brake disk to aid in the adjustment of the cam bolt close to the proper alignment angle.

Alternatively, the entire wheel alignment procedure may be performed with the vehicle wheel rim and tire assembly removed, using a system such as the Acculign 4000 Wheelless Alignment System™, sold by Norkar Technologies, Inc. of Naperville, Ill. However, such "wheel-less" alignment systems are impractical to use, as they require the prior removal of all vehicle wheels prior to performing a vehicle wheel alignment procedure, even if wheel removal is not required to perform an adjustment on one or more of the vehicle wheels.

Cam bolts may be supplied by the original equipment manufacturer (OEM), or by an after-market parts manufacturer such as Northstar Manufacturing Company, Inc. Many times, the alignment technician may not have a required OEM cam bolt from a particular part manufacturer in stock. In such situations, it would be desirable to select another cam bolt from stock which can provide the desired camber change. There are other part manufacturers that provide parts books where an appropriate substitute part can be looked up, however this all takes time and, in many cases, the technician will not go to the extra effort required to obtain a suitable substitute cam bolt to make the necessary adjustment.

To install a cam bolt, the standard industry procedure requires the following steps:

1. Measure the current camber, caster, and toe alignment angles using conventional wheel alignment sensors, such as angle transducers or optical targets;
2. Note the amount of camber change necessary to adjust the measured camber angle such that it conforms to the recommended or desired camber angle for the vehicle;
3. In most situations, jack up the front axle of the vehicle and remove the wheel alignment sensor and the wheel rim and tire assembly;
4. Install a magnetic camber gauge on the brake rotor and calibrate it to zero;
5. Remove one of the installed bolts of a two bolt strut and replace it with an adjustment cam bolt in the correct orientation as specified by the cam bolt installation instructions;
6. Loosen the remaining bolt of the two-bolt strut;
7. Adjust the installed cam bolt until the desired amount of camber change is shown on the magnetic camber gauge;
8. Tighten both bolts in the strut;
9. Reinstall the wheel rim and tire assembly;
10. Reattach the wheel alignment sensor;
11. Re-compensate the wheel alignment sensor to account for any change in runout caused by reattaching the wheel adapter to the wheel rim and tire assembly;
12. Lower the front axle back to the runway;
13. Re-measure the wheel alignment angles;
14. Verify that the change in alignment angles resulting from the installation of the cam bolt correspond to the desired change;
15. Repeat steps 3–14 if the resulting alignment angle change is not correct and if removal of the wheel rim and tire assembly is required, or readjust the installed part and repeat steps 13–15.

From the steps of the adjustment procedure outlined above, it is clear that the accuracy of the camber change attained during the installation of the cam bolt using the magnetic camber gauge does not equal the accuracy that is eventually attained using the alignment sensors mounted to the vehicle wheel rim and tire assembly to measure all of the alignment angles. This often results in the repeating of the time-consuming steps 3–14. This method can be improved upon, both in the accuracy of the final camber measurement, and in a reduction in overall vehicle wheel alignment time.

One such improved system, described in U.S. Pat. No. 6,064,927 to Molbach utilizes the operator-input characteristics of an already-installed alignment adjustment component when calculating the characteristics of a replacement alignment component to alter a wheel alignment angle.

BRIEF SUMMARY OF THE INVENTION

Briefly, a wheel alignment adjustment system of the present invention includes sensing apparatus for sensing alignment characteristics of a vehicle to be aligned, and a memory for storing alignment specifications for a plurality of vehicles and alignment adjustment parts. A fixture is provided to secure the sensing apparatus to a wheel hub of the vehicle upon removal of the vehicle wheel rim and tire assembly, and a logic circuit is provided to determine from the sensed alignment characteristics of one or more alignment angles, and from the corresponding alignment angle specifications, an adjustment to after the vehicle alignment characteristics. A display is also included for displaying to a user a representation of the determined alignment.

The fixture of the present invention is configured for attachment to a vehicle wheel hub following removal of a vehicle wheel rim and tire assembly. The fixture provides a mounting to which a wheel alignment sensor or wheel alignment target may be secured, thereby permitting measurement of one or more of the vehicle wheel alignment angle parameters from the position and orientation of the vehicle wheel hub, in contrast to the camber-only measurements obtained from the use of prior art magnetic camber gauges.

A method of the present invention facilitates adjusting vehicle wheel alignment, and in adjusting vehicle wheel camber and caster. The method comprises the following steps:

1. Measure the current camber, caster, and toe alignment angles using conventional wheel alignment sensors, such as angle transducers or optical targets;
2. Note the amount of camber change necessary to adjust the measured camber angle such that it conforms to the recommended or desired camber angle for the vehicle;
3. In most situations, jack up the front axle of the vehicle and remove the wheel alignment sensor and the wheel rim and tire assembly;
4. Secure a wheel alignment sensor or wheel alignment target to the wheel hub; measure the wheel alignment of the wheel hub;
5. Calculate a change in alignment angles between the stored vehicle wheel rim and tire assembly measurement and the wheel hub measurement to provide current vehicle wheel alignment measurements;
6. Adjust or replace alignment components in response to the current vehicle wheel alignment measurements; removing the wheel alignment sensor or wheel alignment target from the wheel hub;
7. Reinstalling the vehicle wheel rim and tire assembly and the alignment sensor;
8. Re-compensate the wheel alignment sensor to account for any change in runout caused by reattaching the wheel adapter to the wheel rim and tire assembly; and
9. Lower the front axle back to the runway.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
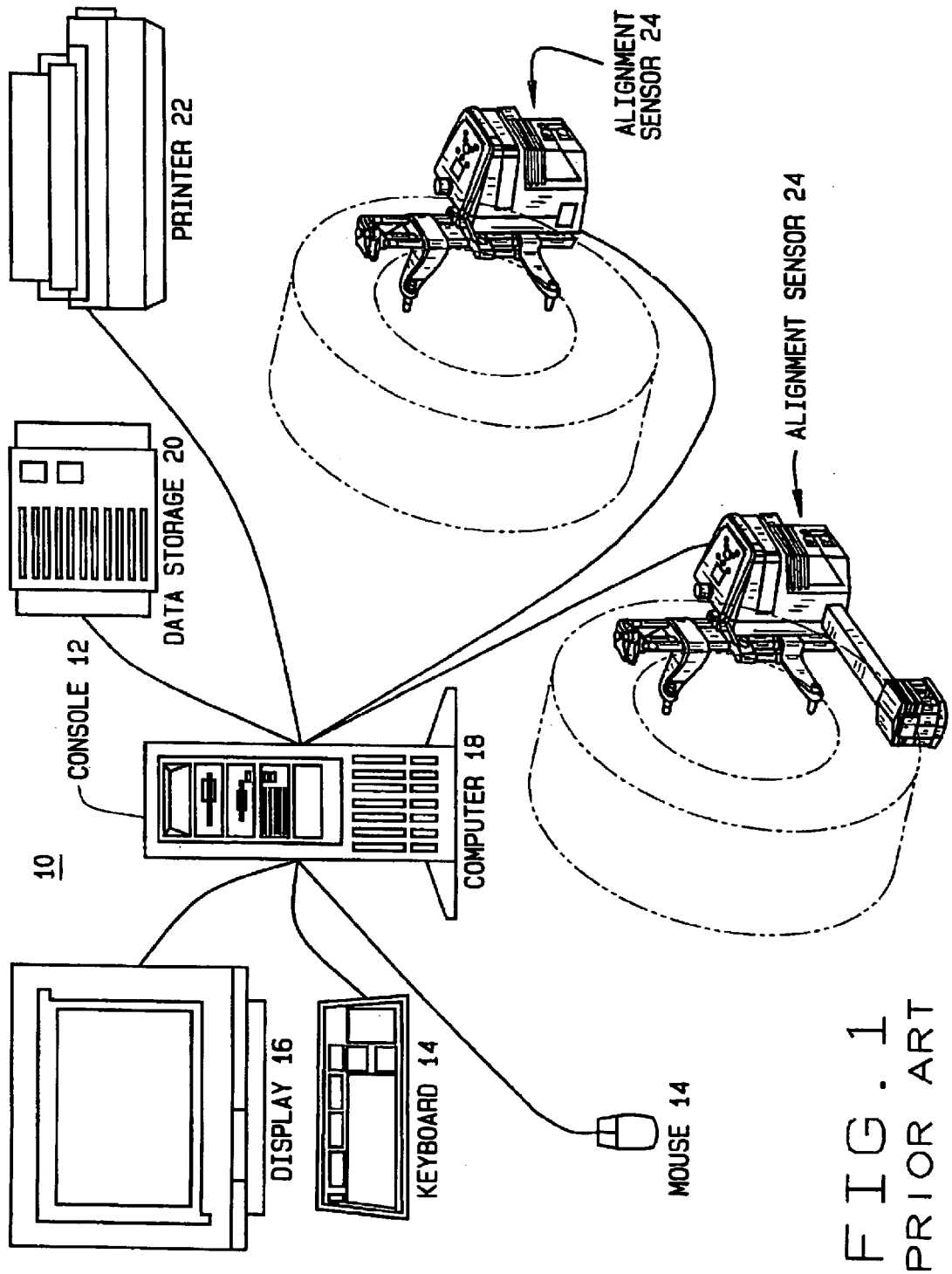
FIG. 1 illustrates the components of a conventional vehicle wheel alignment system.

It is preferred that the present invention be utilized in combination with a conventional computer controlled vehicle wheel alignment system 10, shown in FIG. 1, such as those shown in U.S. Reissue Pat. No. 33,144 to Hunter et al., U.S. Pat. No. 5,598,357 to Colarelli et al, and U.S. Pat. No. 4,381,548 to Grossman et al., the disclosures of which are incorporated herein by reference. Conventional computer controlled vehicle wheel alignment systems, such as the Series 611 console with DSP-300 series wheel sensors are sold by Hunter Engineering Company of Bridgeton, Mo. The present invention may further be utilized with alternate vehicle wheel alignment systems utilizing active or passive optical alignment targets such as those disclosed in U.S. Pat. No. 5,535,522 to Bernie F. Jackson, and U.S. Pat. No. 5,675,515, to Daniel B. January in place of conventional angle transducer alignment sensors. Alternative computer controlled vehicle wheel alignment systems utilizing optical targets and sensors, such as the Series 611 console with DSP400 series wheels sensors are additionally sold by Hunter Engineering Company.

Alignment system 10 includes a console 12 suitably positioned for use by a technician/user, and one or more input devices 14, such as input keys, a mouse, switches, or one or more microphones. A display 16 is provided, and is preferably a CRT computer monitor display, but may be an LCD display or other conventional display configured to receive information from a computer for presentation to a user.

The input devices 14 and display 16 are connected to a microcomputer 18 (or other suitable logic, circuit). The microcomputer 18 is connected to a digital memory 20 and is optionally in communication with a printer 22. It will be recognized by those of ordinary skill in the art that the digital memory 20 may be internal to the microcomputer, as is found in conventional general purpose computers, or may be located external to the microcomputer 18 and connected by a communications network such as the Internet. One or more suitable vehicle alignment sensors 24 are operatively connected to the microcomputer 18 for supplying measured alignment information to the microcomputer 18. Such sensors are shown in the above-mentioned U.S. patents, and in U.S. Pat. No. 4,879,670 to Colarelli, or U.S. Pat. No. 5,870,315 to January, the disclosures of which is also incorporated herein by reference. Overall, the alignment system 10 works interactively with the technician/user as is described in detail in the aforementioned U.S. Pat. No. 5,598,357.

It is conventional for vehicle wheel alignment systems 10 to have access to a database of vehicle specifications stored in the digital memory 20 or other data storage medium in communication with the microcomputer 18. In a first embodiment, the vehicle specification database of the present invention includes vehicle wheel alignment specifications, which are accessed by the microcomputer 18 for use in response to the identification to the wheel alignment system 10 of the vehicle make, model, and year. In addition to storing vehicle specifications, type and size information, such as sizes, orientations, and associated adjustment ranges, related to a plurality of wheel alignment adjustment components such as bolts or wedges, is stored in the digital memory 20 or other data storage medium.

During a vehicle alignment procedure, the information received from the wheel alignment sensors 24, together with the vehicle specification information retrieved from storage in the digital memory 20 or other data storage medium is used by the microcomputer 18 to recommend wheel alignment adjustments and to identify to the technician/user one or more wheel alignment adjustment components having suitable adjustment characteristics, the installation of which will result in the recommended wheel alignment adjustments. The stored alignment adjustment component size, orientation, and associated adjustment range information is used by the microcomputer 18, to determine which adjustment component should be used, at what orientation the component should be installed, and if the maximum adjustment range of the component is sufficient to correct a detected alignment error.

Turning to FIG. 2, reference numeral 26 indicates a first embodiment of a fixture provided for use with the vehicle alignment sensors 24. The fixture 26 is configured for attachment to a wheel hub 28 of a vehicle 30 after removal of a wheel rim and tire assembly (not shown), and provides a mounting point for the vehicle wheel alignment sensors 24.

Fixture 26 thereby permits wheel alignment measurements to be obtained from the vehicle wheel hub assembly 28, after removal of a wheel rim and tire assembly and during the installation or adjustment of an alignment adjustment component 32 such as a cam, bolt, offset ball joint, camber wedge, or upper strut mount.

Figure 2A:
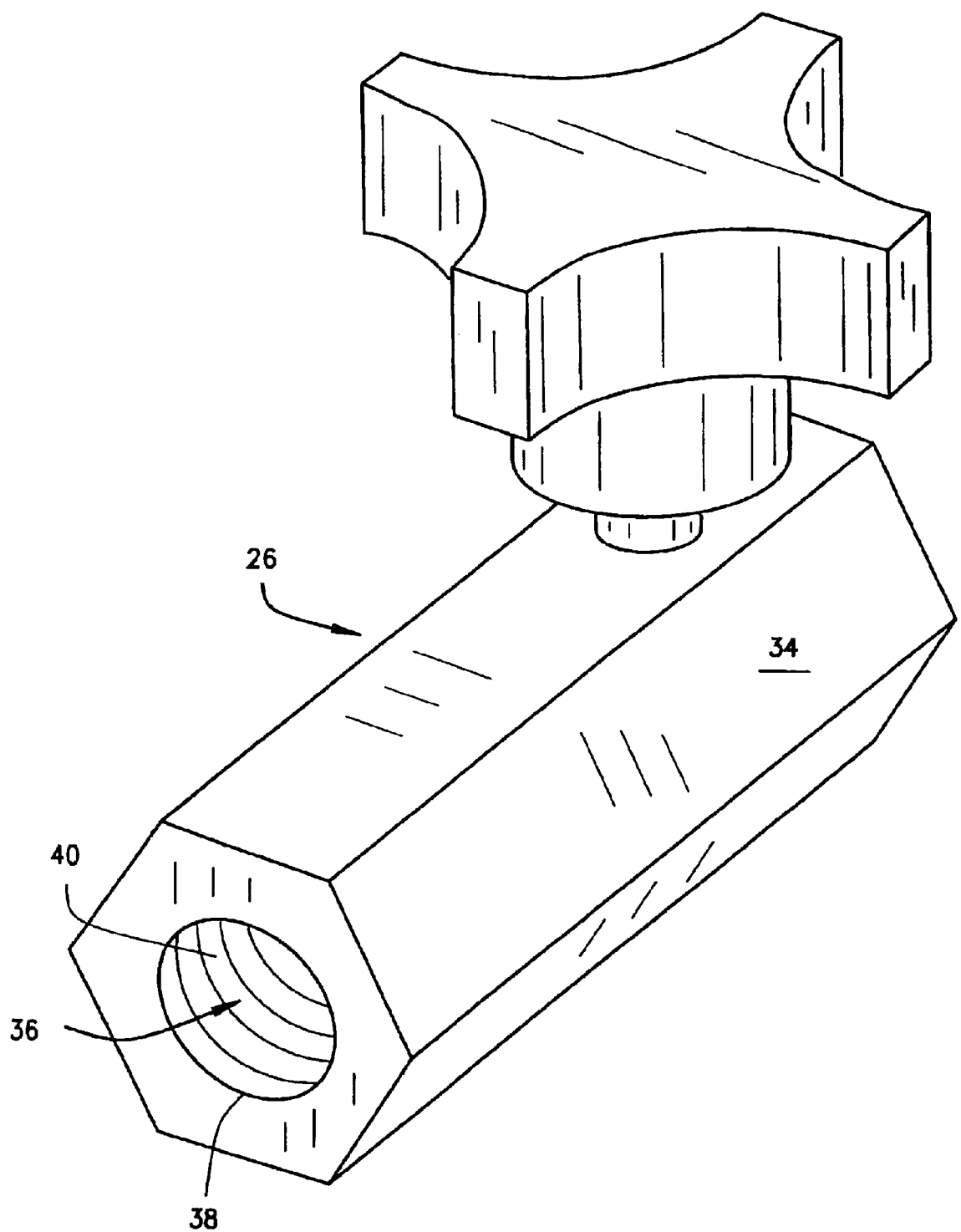
FIG. 2A is a perspective view of the fixture of the present invention for mounting a wheel alignment sensor to a vehicle wheel hub.
Figure 2B:
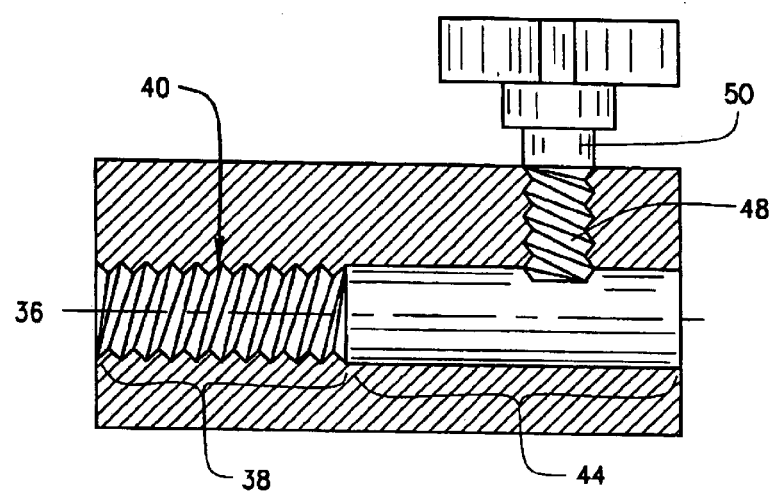
FIG. 2B is a sectional view of the fixture of FIG. 2A.

The first embodiment of fixture 26, illustrated in FIGS. 2A and 2B, comprises an elongated body 34, having a longitudinal axial bore 36. A first portion 38 of the inner surface 40 of the bore 36 is sized and threaded to engage the threaded surface of a wheel mounting stud 42 protruding from the vehicle wheel hub assembly 28. The second portion 44 of the inner surface 40 of the axial bore 36 is finished in a smooth surface, and sized to receive a cylindrical mounting stud 46 from a vehicle wheel alignment sensor 24 in a friction fit. A transverse threaded bore 48 radially intersects the axial bore 36, and receives a threaded locking knob 50.

Figure 2C:
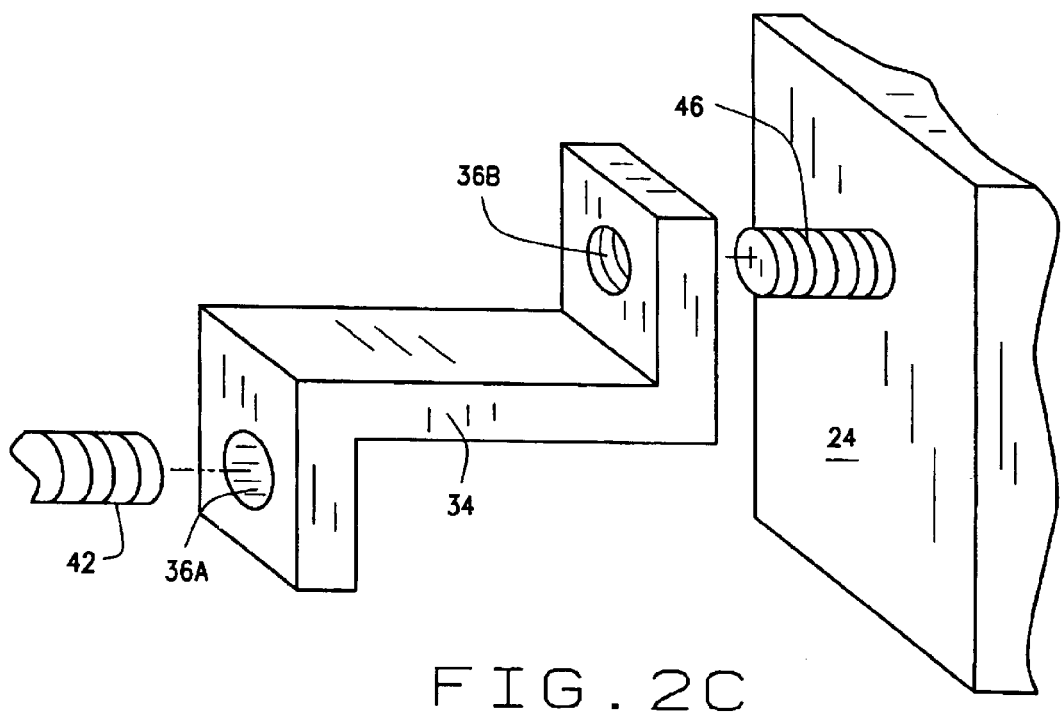
FIG. 2C is a perspective view of a second embodiment of the fixture of the present invention, offset for mounting a wheel alignment sensor to a vehicle wheel hub.
Figure 3:
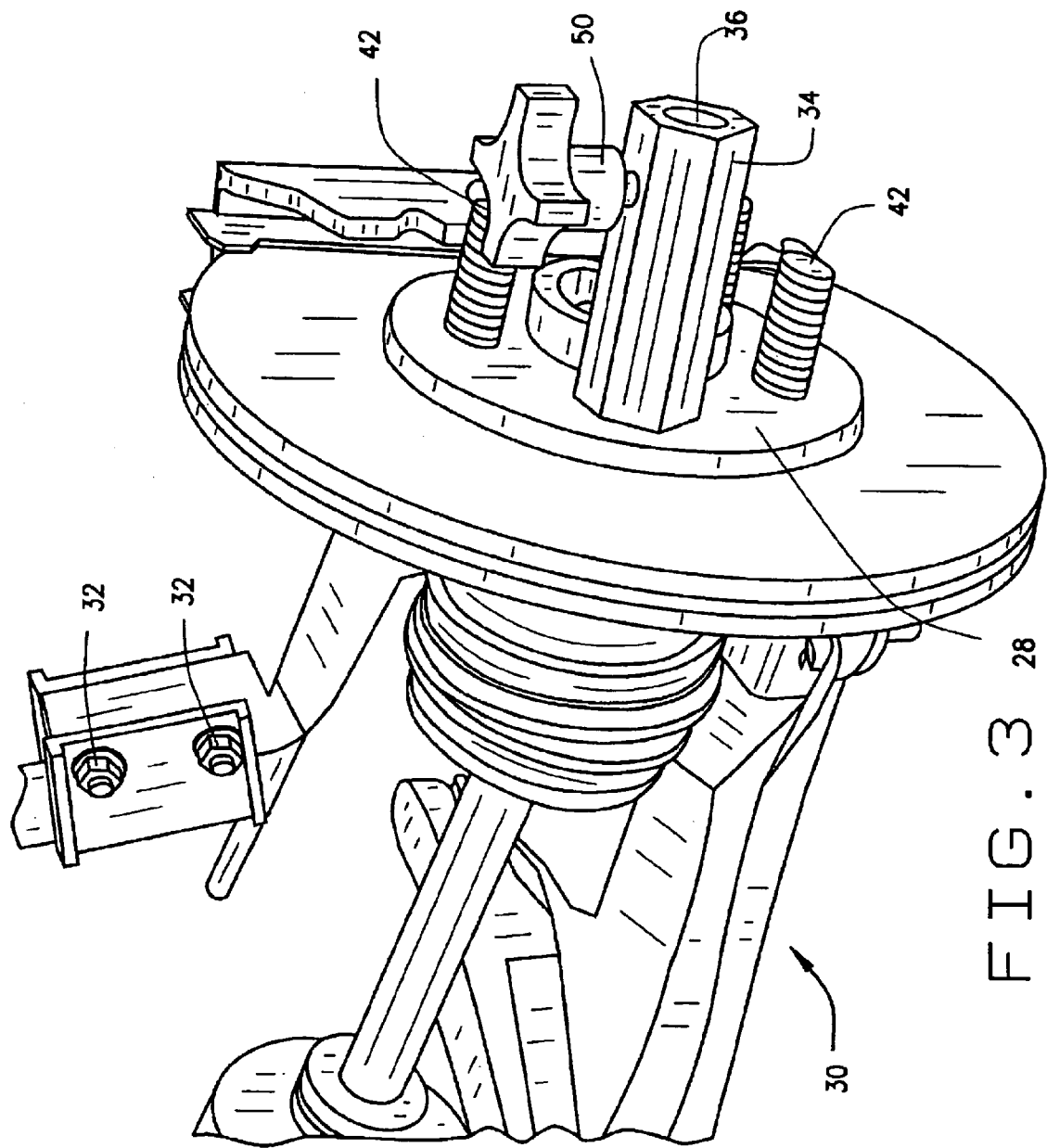
FIG. 3 is a perspective view of the fixture of FIG. 2 mounted to a vehicle wheel hub following removal of a vehicle wheel rim and tire assembly.
Figure 4:
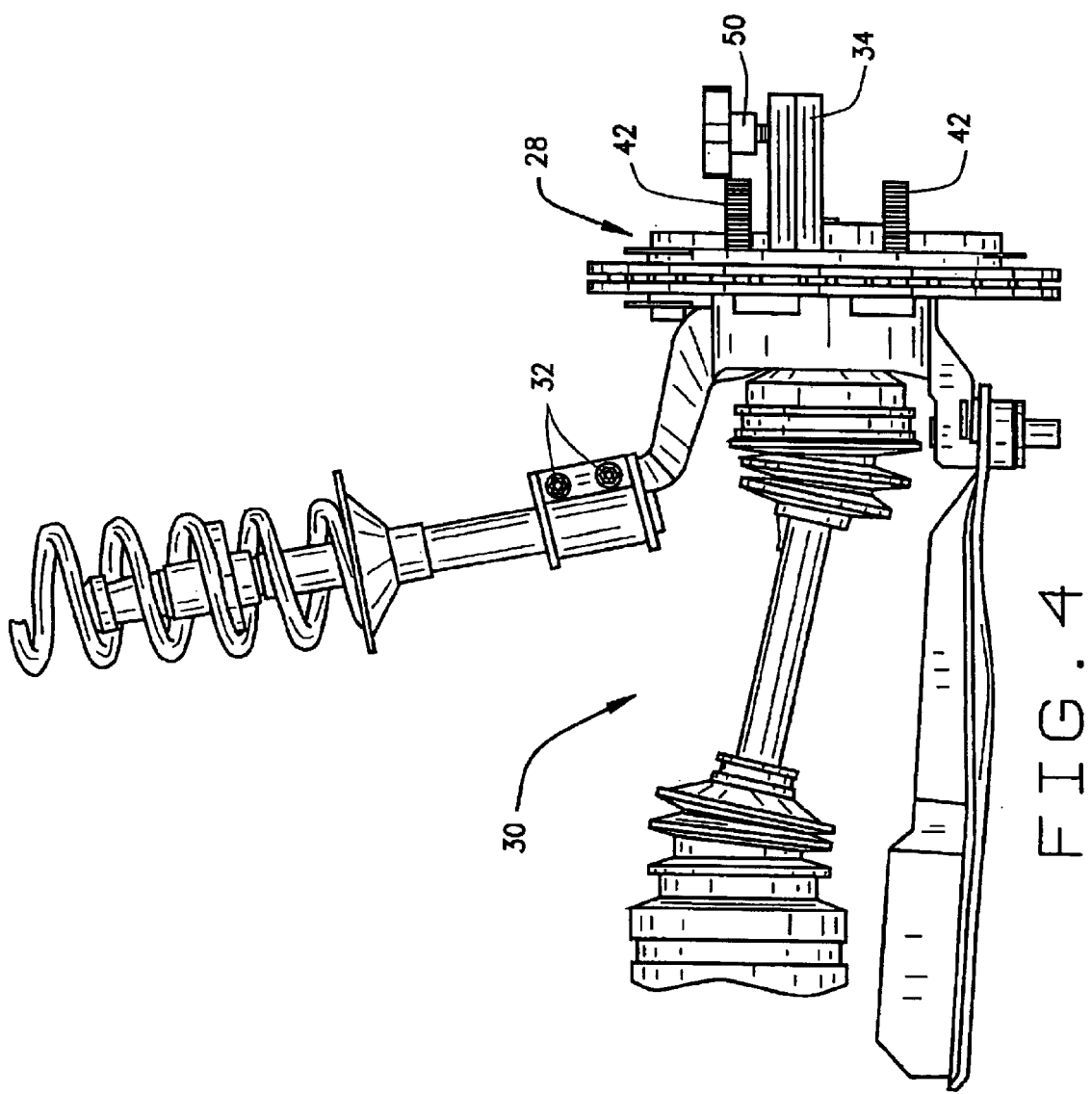
FIG. 4 is a side view of the fixture of FIG. 2 mounted to the vehicle wheel hub, as seen in FIG. 3.
Figure 5:
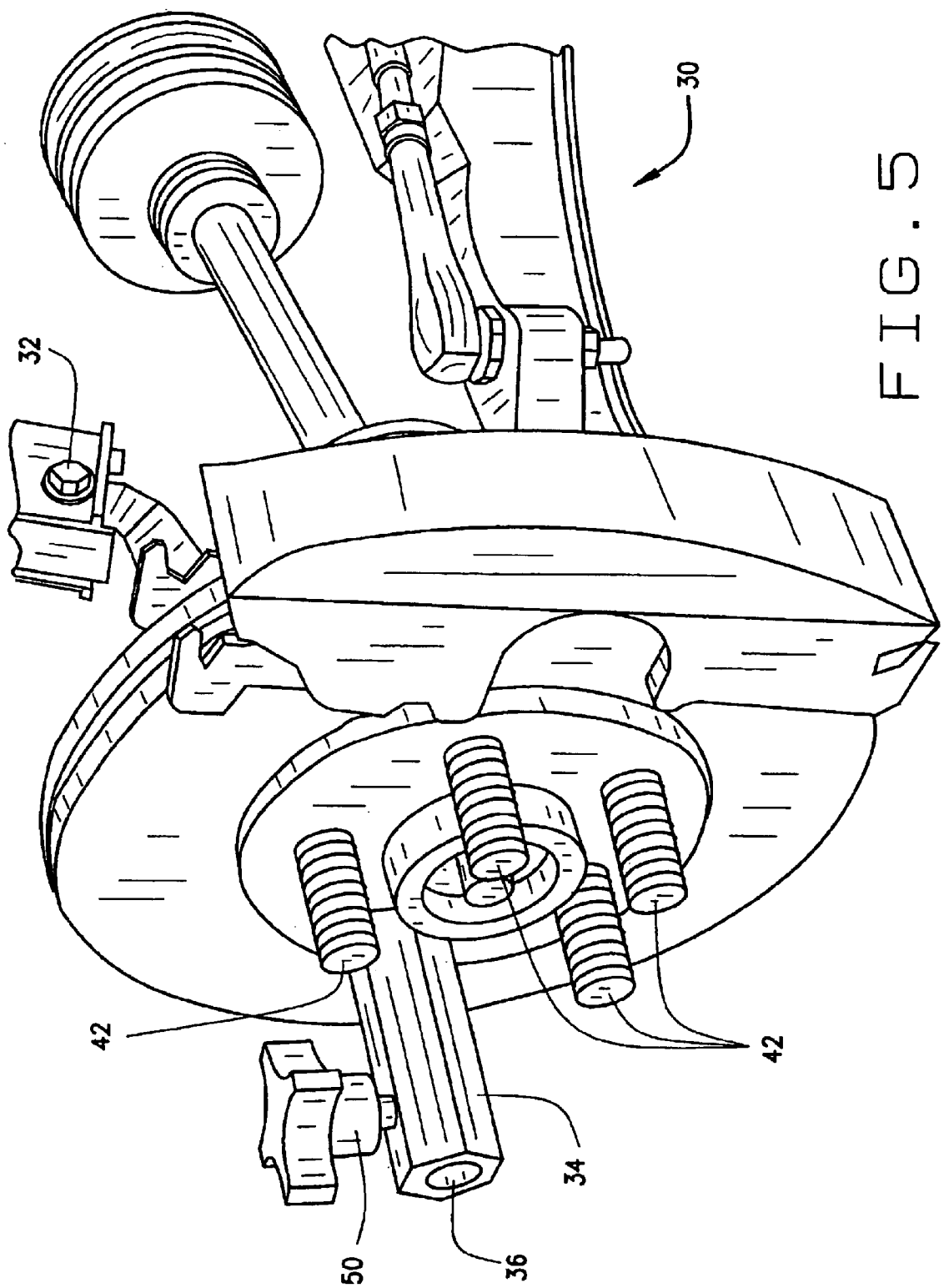
FIG. 5 is a perspective view similar to FIG. 3, from a reverse angle.
Figure 6:
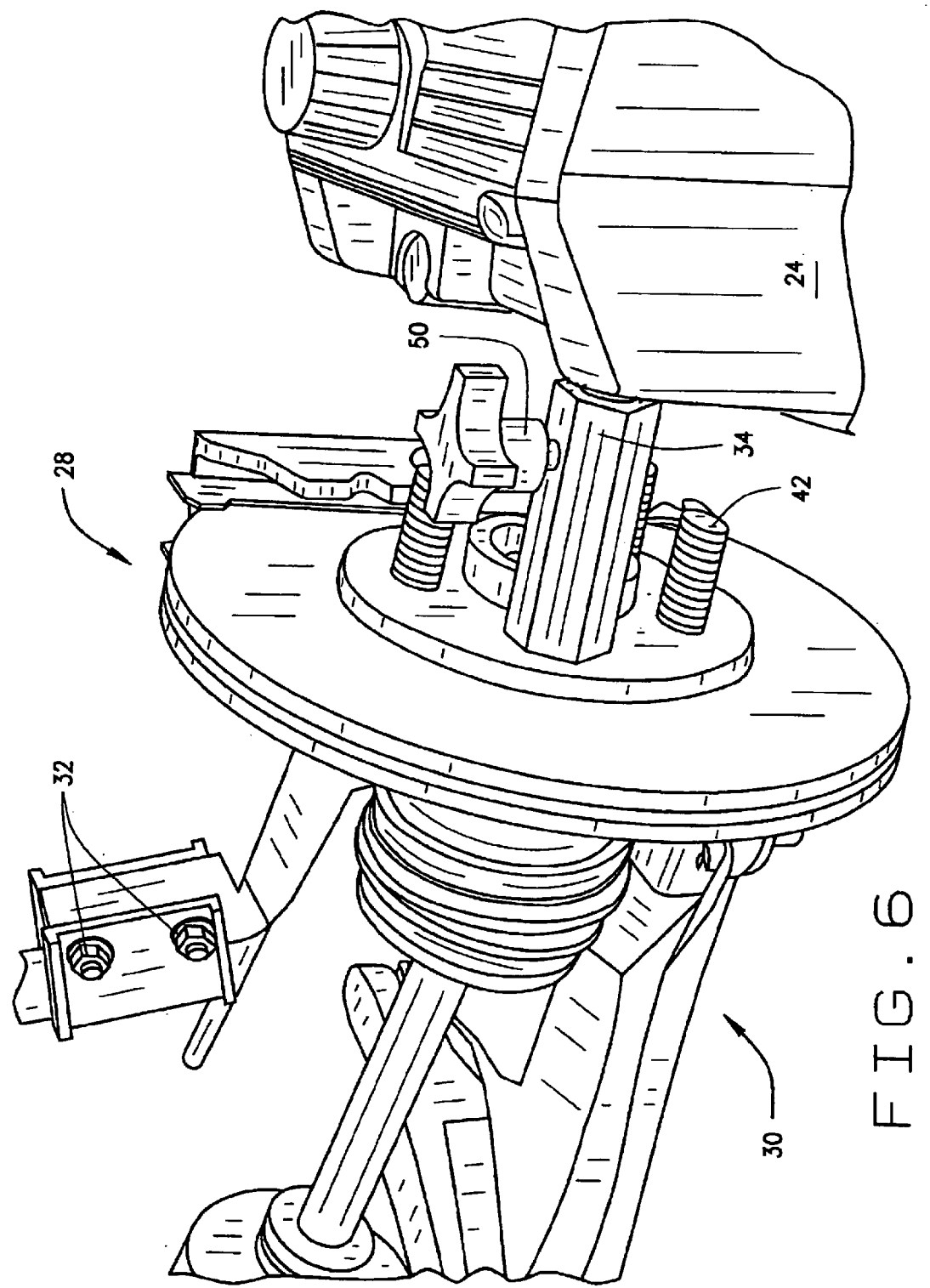
FIG. 6 is a perspective view similar to FIG. 3, with a wheel alignment sensor mounted to the fixture.
Figure 7:
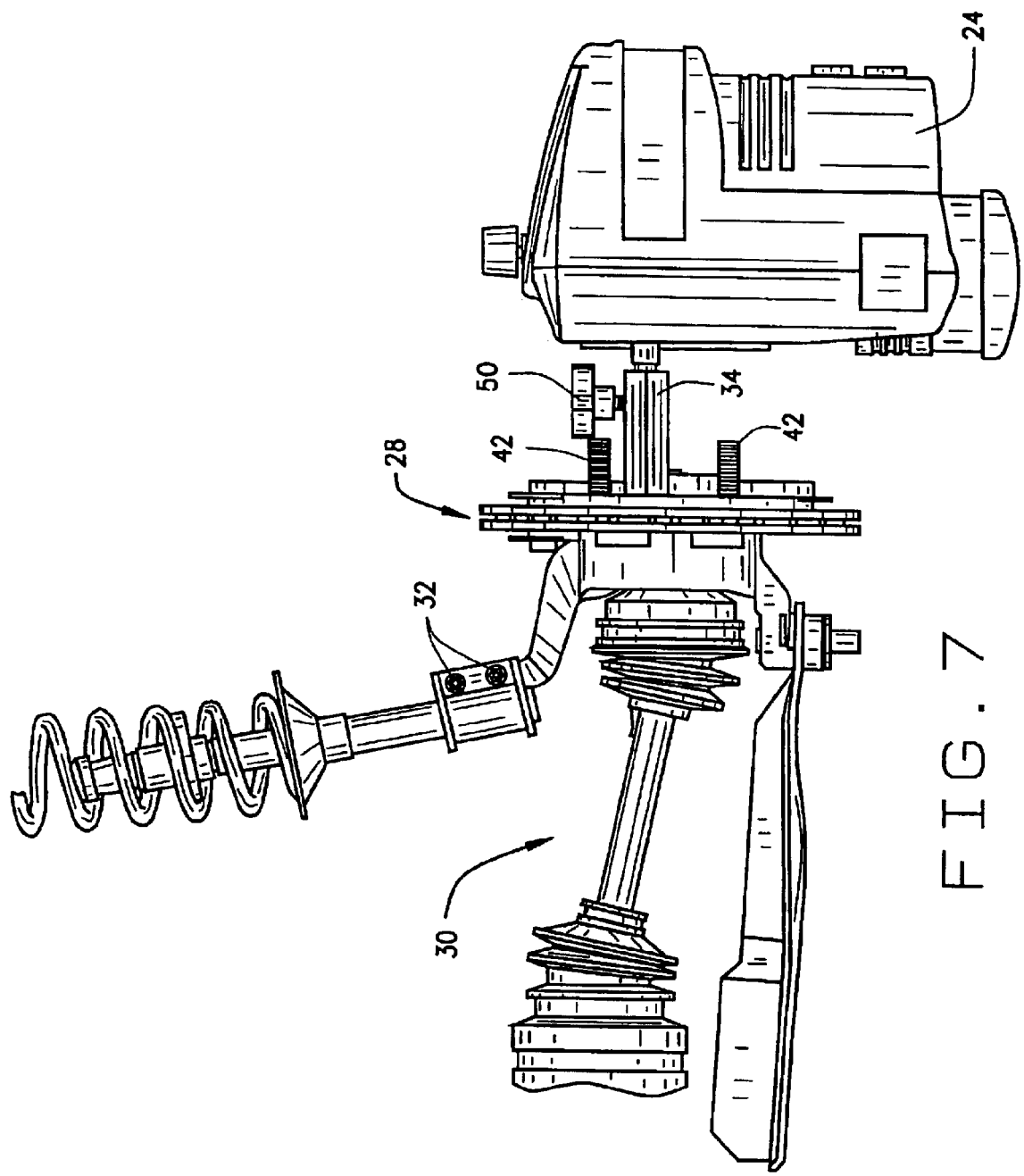
FIG. 7 is a side view similar to FIG. 4, with a wheel alignment sensor mounted to the fixture, as seen in FIG. 6.
Figure 8:
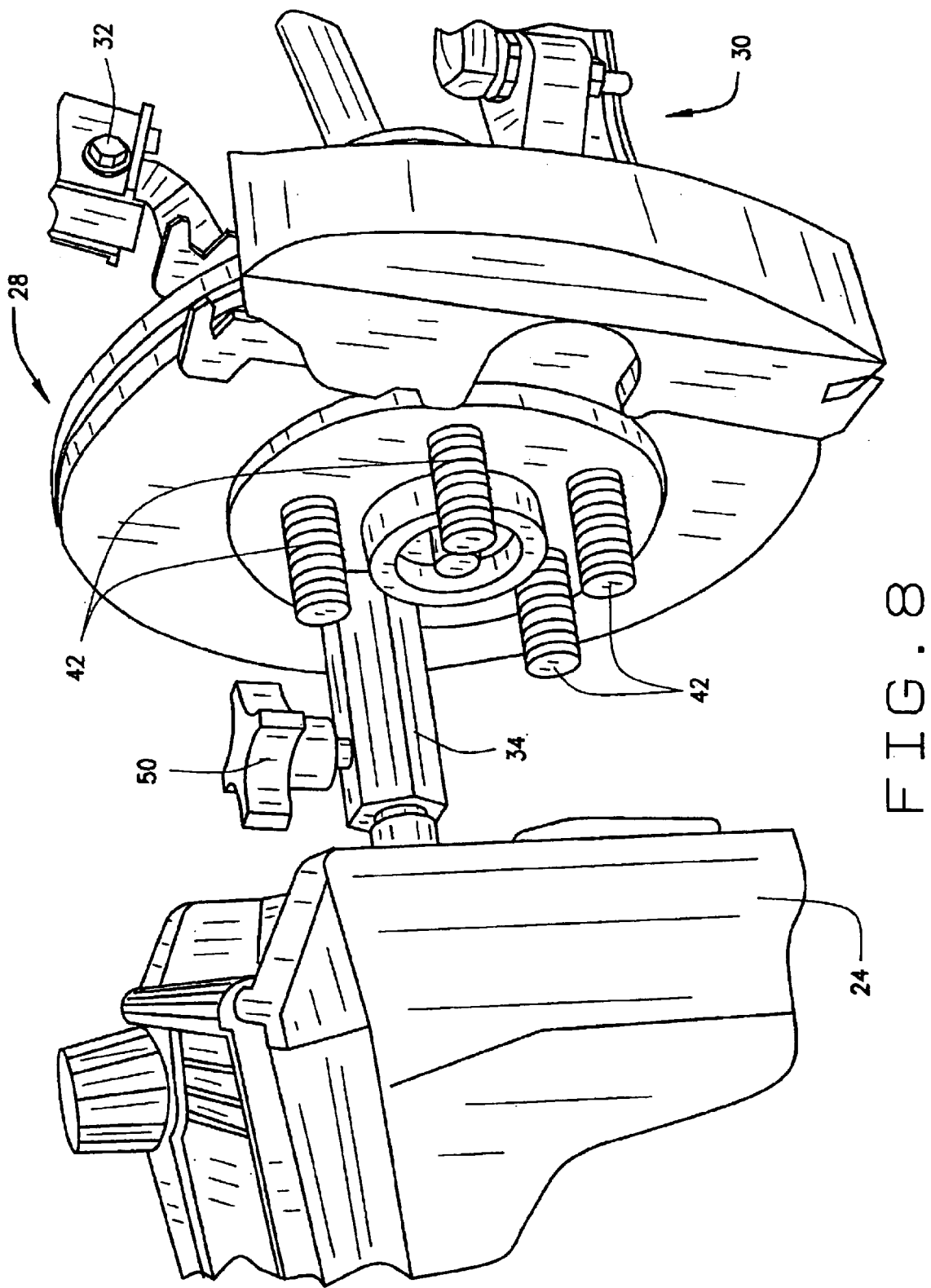
FIG. 8 is a perspective view similar to FIG. 6, from a reverse angle.

Those of ordinary skill in the art will recognize that numerous variation of the fixture 26 are possible. For example, as seen in FIG. 2C rather than having first and second portions of bore 36, two bores 36a, 36b may be provided in the body 34. A first bore adapted to engage a wheel mounting stud 42, either by threads or a slip-fit, and a second bore adapted for receiving mounting stud 46 from a wheel alignment sensor 24. The first and second bores need not be co-axially mounted, but may be offset to provide desired wheel hub assembly 28 clearance for the wheel alignment sensor 24.

Turning to FIGS. 3–8, the first embodiment of fixture 26 of the present invention is illustrated in connection with the measurement of a wheel alignment angle from the wheel hub assembly 28. The method illustrated in FIGS. 3–8 includes the following steps:

1. To mount the wheel alignment sensor 24 to a wheel hub assembly 28, the technician installs the wheel hub adapter fixture 26 on the wheel hub assembly. Fixture 26 is installed on the wheel hub assembly 28 by threading bore 36 of the fixture 26 onto wheel mounting stud 42.
2. Next, the wheel alignment sensor 24 is removably mounted onto the fixture 26. To mount the wheel alignment sensor 24 to the fixture 26, a cylindrical mounting shaft 46 of the wheel alignment sensor 24 is inserted into the second portion 44 of the axial bore 36 in fixture 26.
3. The wheel alignment sensor is then leveled in a conventional manner, and locked into place by the tightening of the threaded locking knob 50 or conventional clamping mechanism.
4. With the wheel alignment sensor 24 leveled and locked to the wheel hub assembly 28, the microcomputer 18 records the wheel hub assembly 28 alignment angles measured by the wheel alignment sensor 24. The wheel alignment sensor 24 may be configured to produce a single set of alignment angle measurements, or to generate a series of alignment angle measurements over time to measure "live" alignment angles as is conventional in the wheel alignment industry.
5. The recorded wheel hub alignment angle measurements are utilized by the microcomputer 18 to provide a display of the current or "live" alignment angle measurements obtained at the wheel hub to the technician on display 16.

The fixture 26 of the present invention may be further utilized to facilitate the replacement or installation of an alignment adjustment cam bolt to alter a vehicle camber setting by permitting alignment measurements to be obtained following removal of the wheel rim assembly from the wheel hub assembly 28. It will be appreciated that alternate alignment adjustment components, such as wedges, may be employed to alter a vehicle camber setting within the scope of the invention, and that the fixture 26 may be employed to facilitate the adjustment of other alignment angles, such as caster.

An exemplary method for using the first embodiment of fixture 26 of the present invention to facilitate a vehicle alignment procedure is as follows:

1. Vehicle alignment sensors 24 are mounted to the vehicle wheel rim and tire assemblies, and at least one alignment angle measurement (Measurement A) is taken and stored.
2. To install or adjust an identified alignment adjustment component, the technician removes at least one wheel alignment sensor 24 and wheel rim and tire assembly from an associated wheel hub assembly 28.
3. The technician installs the wheel hub adapter fixture 26 on the wheel hub assembly 28 to remount the wheel alignment sensor 24 to the wheel hub assembly 28. Fixture 26 is installed on the wheel hub assembly 28 by threading bore 36 of the fixture 26 onto wheel mounting stud 42. The cylindrical mounting stud 46 of the wheel alignment sensor is inserted into the second portion 44 of the axial bore 36.
4. The wheel alignment sensor is secured to the wheel hub adapter fixture 26 by the tightening of the threaded locking knob 50 or a conventional locking lever on the fixture 26.
5. With the wheel alignment sensor 24 secured to the wheel hub assembly 28, at least one alignment angle measurement is taken (Measurement B) and a wheel-off delta change is calculated from the previously stored alignment angle measurement.
   (1) (Measurement A)—(Measurement B)=(wheel-off delta change) The wheel-off delta change is stored, and utilized to offset specification values or subsequent measurements.
   (2) (Measurement B)+(wheel-off delta change)=(Corrected Live Measurement C)
   (3) (Corrected Live Measurement C)—(Specification Value)=(Necessary Alignment Angle Adjustment)

Those of ordinary skill in the art will readily recognize that equations of mathematical equivalency may be substituted for (1), (2), and (3), above to yield a value for the Necessary Alignment Angle Adjustment.

6. Utilizing the offset measurement information, the technician adjusts, or installs and adjusts, an alignment adjustment component to obtain the desired alignment angle adjustment.
7. Once the adjustment or installation is completed, the technician removes the wheel alignment sensor 24 from the fixture 26, unthreads the fixture 26 from the wheel mounting stud 42, and reinstalls the wheel rim and tire assembly.
8. The vehicle alignment sensor 24 is remounted to the vehicle wheel rim and fire assembly, and current alignment angle measurements are taken.

Those of ordinary skill in the art of vehicle wheel alignment will recognize that if the wheel alignment sensor 24 is a no-compensation type sensor, it will not be necessary to compensate for runout upon re-mounting the vehicle alignment sensor to the vehicle wheel rim and tire assembly.

Although fixture 26 of the present invention is described primarily for use with the installation and adjustment of a camber adjustment bolt, it will be readily appreciated that it is equally applicable for use with wedges, adjustable ball joints, and upper strut mounts, as well as any alignment angle adjustment or repair procedures for which the removal of the vehicle wheel rim and tire assembly. For example, those of ordinary skill in the vehicle wheel alignment field will understand the applicability of the present invention to the adjustment of vehicle alignment angles.

Figure 9:
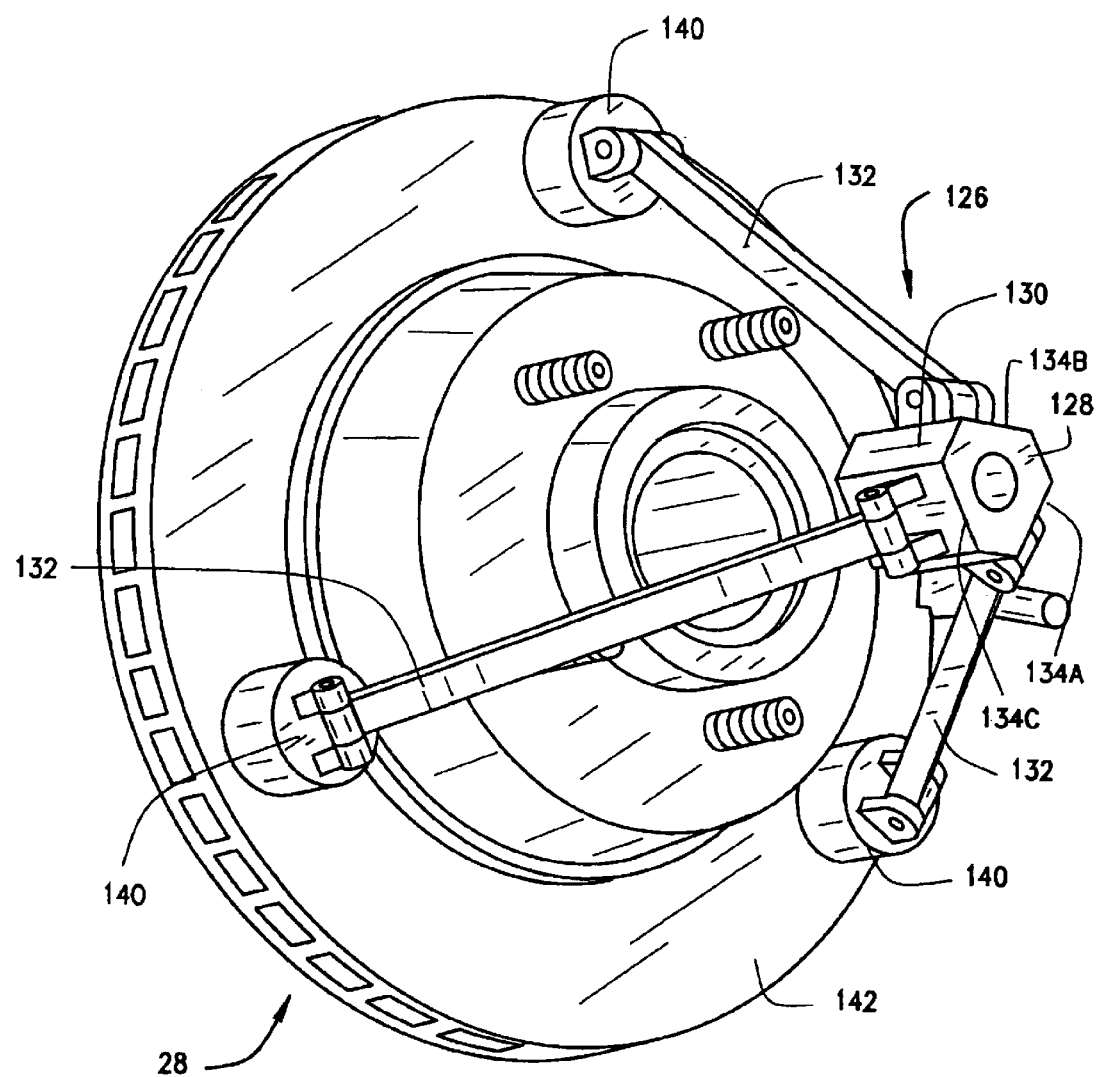
FIG. 9 is a perspective view of an alternate embodiment of the fixture of the present invention magnetically mounted to a vehicle wheel hub assembly.

Turning next to FIGS. 9–14, alternate embodiments of fixture 26 are illustrated. In FIG. 9, a first alternate embodiment is illustrated wherein a fixture 126 comprises a central wheel alignment sensor mount 128 configured with three identical support arms 132 equidistantly spaced about a exterior surface 130. As seen in FIG. 9, the exterior surface 130 of the central wheel alignment sensor mount 128 comprises at least three equidistantly spaced facets 134a, 134b, and 134c, each of which provides an attachment point for a support arm 132.

Those of ordinary skill in the art will recognize that different configurations of the central wheel alignment sensor mount 128 are possible within the scope of the invention, and that the number of support arms 132 may be varied depending upon the application. In the embodiment shown in FIG. 9, each of the support arms 132 is articulated at the connection to the central wheel alignment sensor mount 128 so as to form an adjustable tripod. Each support arm 132 includes an articulated foot 140 adapted to grip a surface of a vehicle wheel hub assembly, such as a brake rotor 142.

Figure 10:
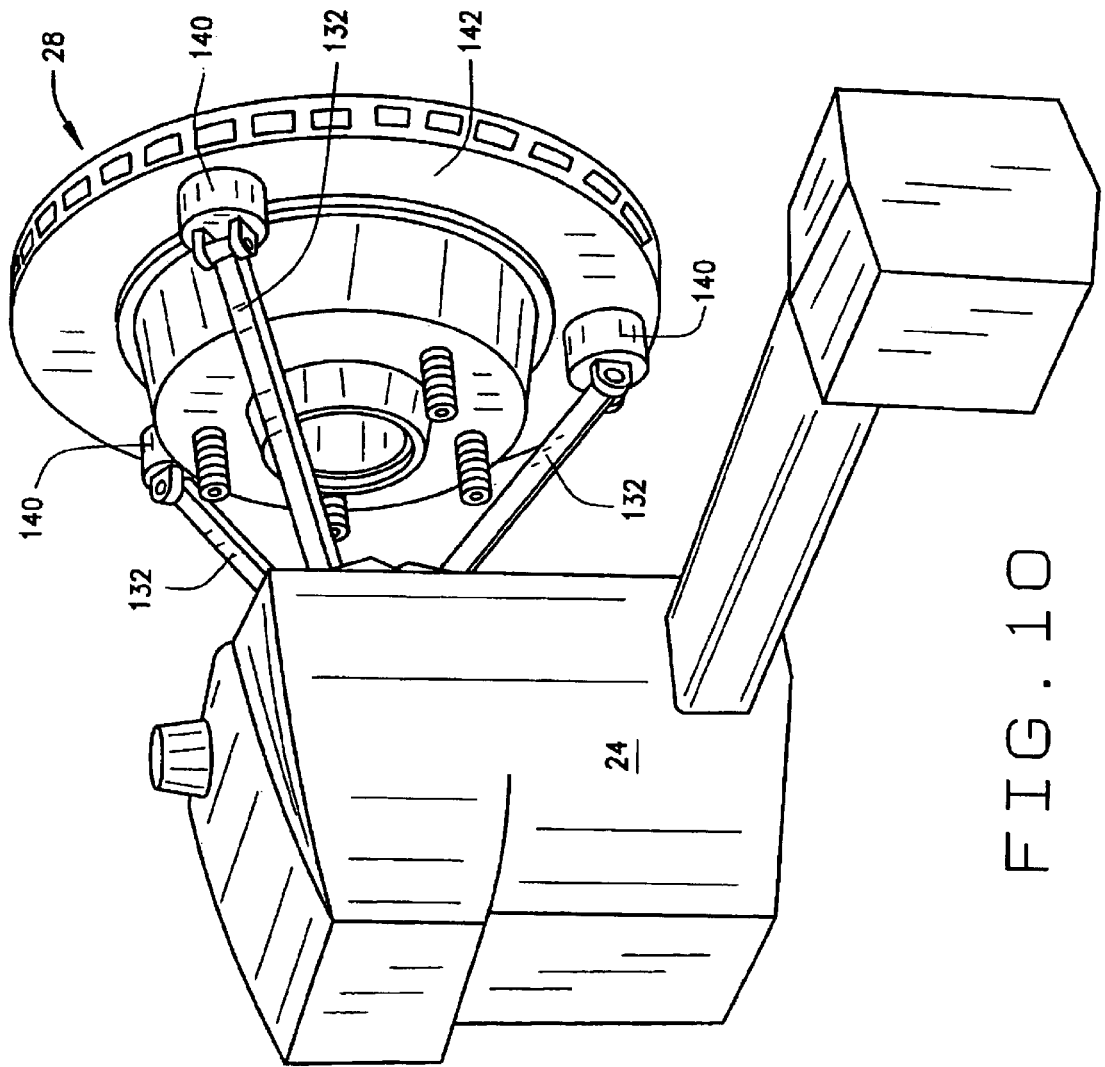
FIG. 10 is a perspective view of a wheel alignment sensor assembly mounted to the fixture illustrated in FIG. 9.

In one embodiment, each articulated foot 140 includes a permanent magnet which is attracted to ferromagnetic materials in the brake rotor 142 on the wheel hub assembly. Alternative designs may include suction cups or hooks configured to grip the edges of the brake rotor 142. Once the fixture 126 is mounted onto the vehicle wheel hub assembly 28, a vehicle wheel alignment sensor 24 is secured to the fixture 126 at the sensor mount 128, as is shown in FIG. 10.

Figure 11:
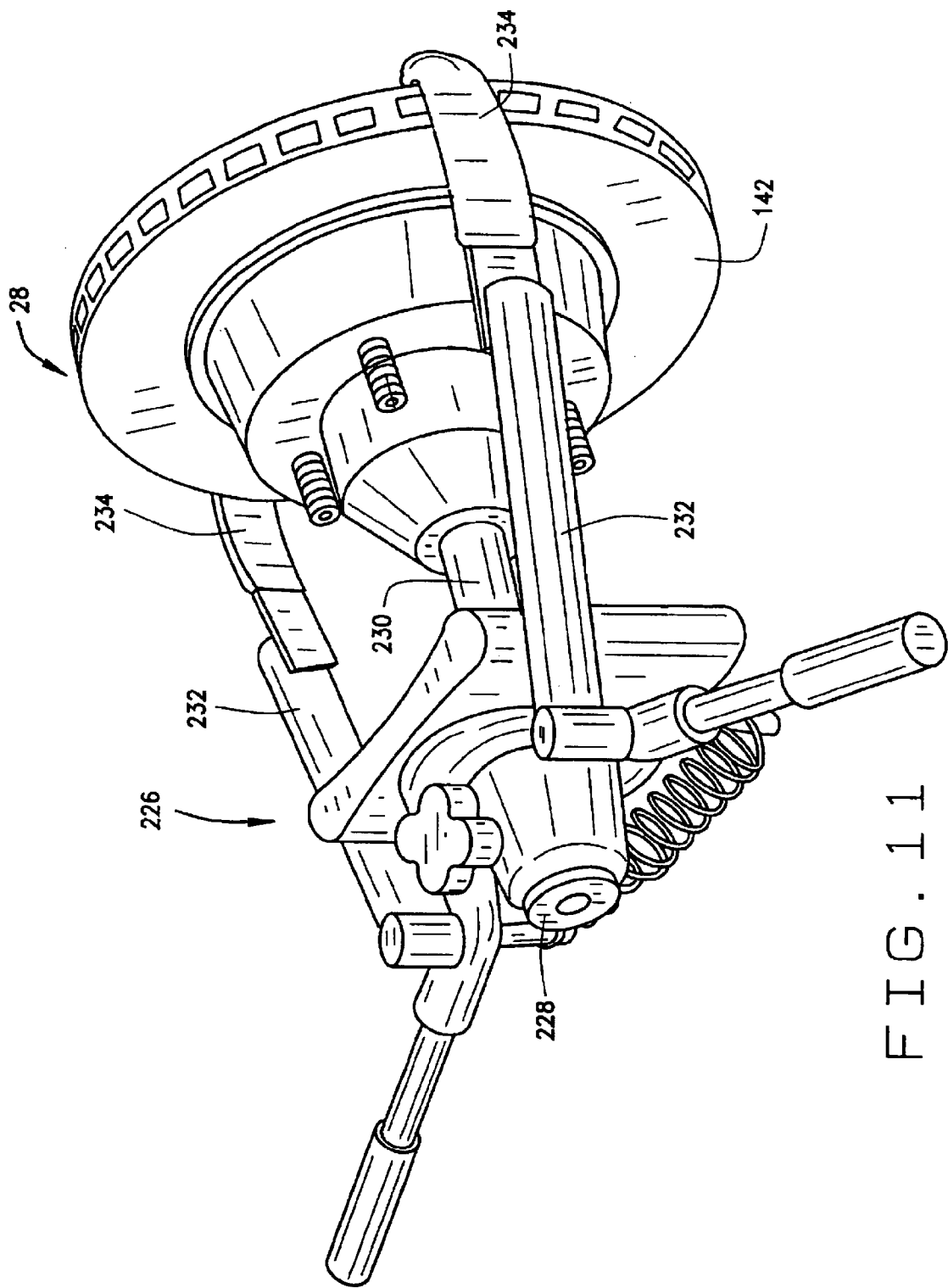
FIG. 11 is a perspective view of an alternate embodiment of the fixture of the present invention clamped to a vehicle wheel hub assembly.

In FIG. 11, a second alternate embodiment is illustrated wherein a fixture 226 comprises a wheel alignment sensor mount 228 configured with a central support arm 230 adapted to seat or brace against the surface of the central portion of the vehicle wheel hub assembly 28. A pair of articulating clamping arms 232 are secured to the sensor mount 228. Each clamping arm is configured to grip a surface of the wheel hub assembly 28, such as the brake rotor as seen in FIG. 11, thereby holding or biasing the central support arm against the wheel hub assembly 28.

Figure 12:
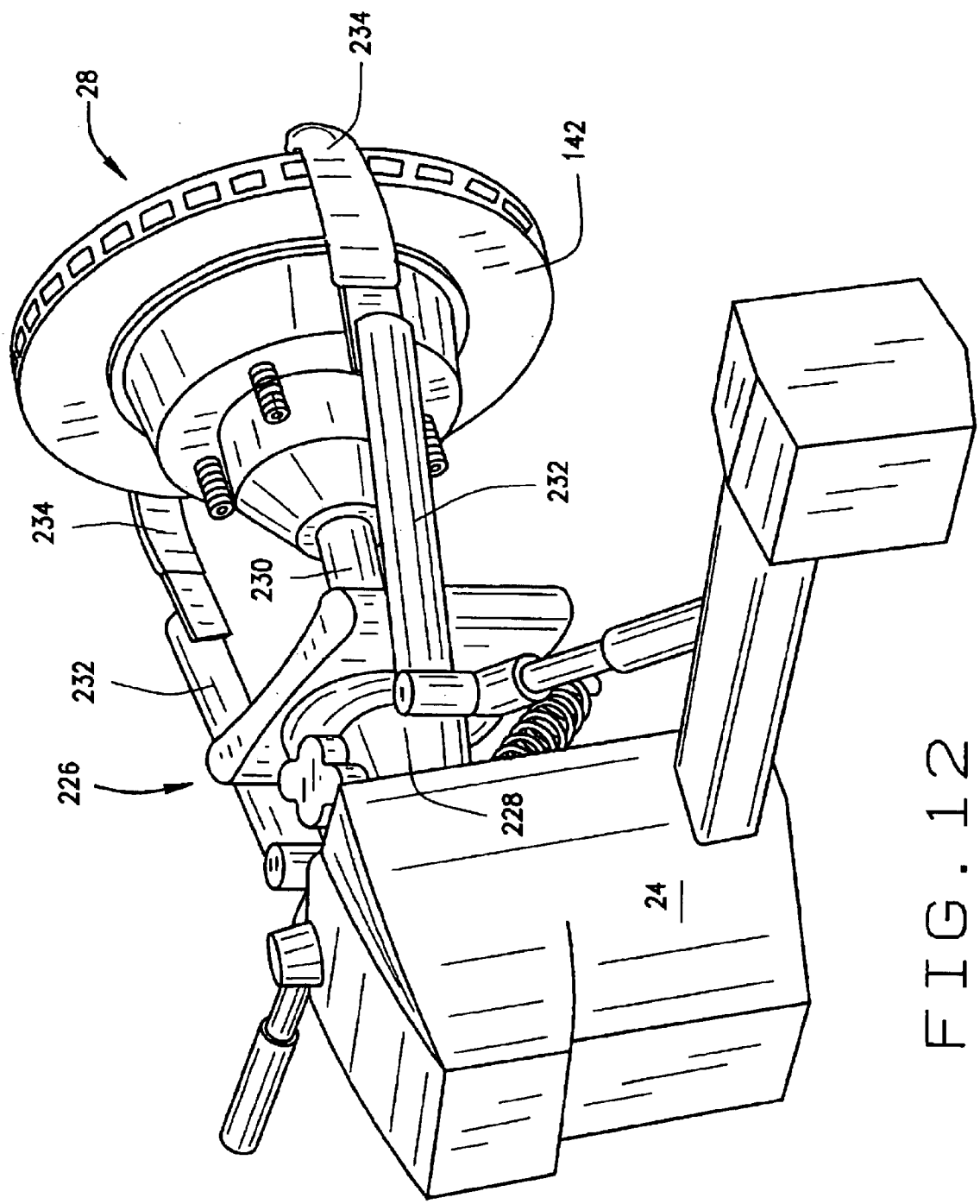
FIG. 12 is a perspective view of a wheel alignment sensor assembly mounted to the fixture illustrated in FIG. 11.

Those of ordinary skill in the art will recognize that different configurations of the central wheel alignment sensor mount 228 are possible within the scope of the invention, and that the number of clamping arms 232 may be varied depending upon the application. In the embodiment shown in FIG. 11, each of the clamping arms 232 is position on an opposite side of the sensor mount 228, and is articulated at the attachment to the sensor mount to provide an adjustable range of gripping motion. Each support arm 232 includes a hook 234 adapted to grip a surface of a vehicle wheel hub assembly, such as the brake rotor 142. Alternative designs may be configured to grip different portions of the wheel hub assembly 28, such as a brake drum. Once the fixture 226 is mounted onto the vehicle wheel hub assembly 28, a vehicle wheel alignment sensor 24 is secured to the fixture 226 at the sensor mount 228, as is shown in FIG. 12.

Figure 13:
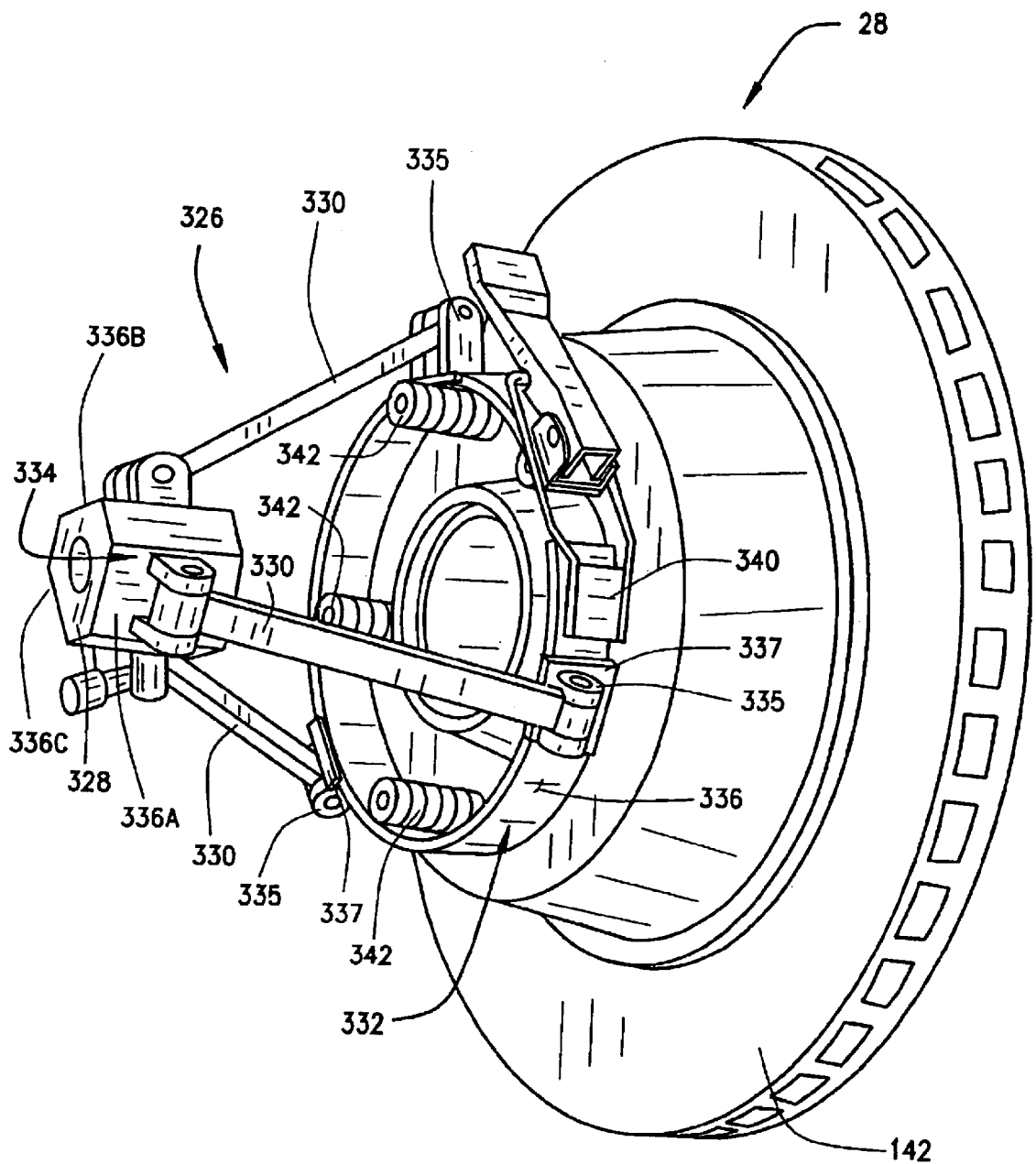
FIG. 13 is a perspective view of an alternate embodiment of the fixture of the present invention secured to a vehicle wheel hub assembly by a strap clamp.

In FIG. 13, a third alternate embodiment is illustrated wherein a fixture 326 comprises a wheel alignment sensor mount 328 configured with three equidistantly spaced supporting arms 330 linked to a strap-clamp 332. As seen in FIG. 13, the exterior surface 334 of the central wheel alignment sensor mount 328 comprises at least three equidistantly spaced facets 336a, 336b, and 336c, each of which provides an attachment point for a support arm 330. Each support arm is articulated at the attachment point to the sensor mount 328, and is movably secured to the surface of the strap clamp 332, thereby holding the sensor mount 328 apart from, and coaxial with, the strap-clamp 332.

As is seen in FIG. 13, the connection between each support arm and the strap clamp 332 comprises an articulated joint 335 and a connection plate 337, fitted around opposite edges of the strap-clamp 332, providing a sliding connection. The strap-clamp 332 is a conventional strap-clamp device, comprising a semi-circular strap 336 onto which the connection plates 337 for each support arm 330 are secured. Opposite ends of the strap 336 are joined by a lever-action or cam-action clamp or latch element 340 to define a circular or ring-type clamp. The clamp or latch element 340 is releasable, permitting the inner diameter of the semi-circular strap 336 to be adjusted in size, facilitating fitting of the strap-clamp 332 over any concentrically arranged components of a wheel hub assembly 28. As the inner diameter of the semi-circular strap 336 is adjusted inward or outward, the sliding connections between the supporting arms 330 and the semi-circular strap 336 permit the supporting arms 330 to remain equidistantly positioned about the inner diameter, maintaining the sensor mount apart from, and coaxial with, the strap clamp 332.

As seen in FIG. 13, the strap-clamp 332 is fitted around the outside diameter of a circle defined by the protruding wheel studs 342, concentric with the axis of rotation 15 of the wheel hub assembly 28. Once placed around the wheel studs 342, the clamp or latch element 340 is tightened, drawing the opposite ends of the strap 336 together, securing the strap-clamp 332 to the wheel hub assembly by a friction fit against the surface of the wheel studs 342. Those of ordinary skill in the art will recognize that the style and design of the clamp element 340 may be varied from that depicted in FIG. 13, and that other suitable mechanisms designed to draw and hold opposite ends of the strap 336 together may be utilized within the scope of the invention. It will be further recognized that the strap-clamp 332 may be secured to any elements of the wheel hub assembly 28 which are spaced in such a manner as to provided circle concentric with the wheel axis of rotation, such as the surfaces of the brake rotor or wheel spindle.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for measuring at least one vehicle wheel alignment angle from a vehicle wheel hub assembly, comprising:

mounting a wheel alignment sensor to a wheel rim and tire assembly secured to said vehicle wheel hub assembly;

obtaining a first measurement of at least one alignment angle with said mounted wheel alignment sensor;

removing said wheel alignment sensor from said wheel rim and tire assembly;

removing said wheel rim and tire assembly from said vehicle wheel hub assembly;

mounting said wheel alignment sensor to said vehicle wheel hub assembly; and obtaining a second measurement of said at least one alignment angle with said mounted wheel alignment sensor;

calculating an offset angle using said first measurement and said second measurement, said offset angle representative of an angle variation between a wheel-mounted sensor angle measurement and a vehicle wheel hub assembly-mounted sensor angle measurement; and subtracting said calculated offset angle from at least one predetermined specification value for said at least one alignment angle to offset said specification value, wherein one or more subsequent vehicle wheel hub assembly-mounted sensor angle measurements of said at least one alignment angle may be compared with said offset specification value to determine a required wheel alignment adjustment.

2. A method for measuring at least one vehicle wheel alignment angle from a vehicle wheel hub assembly, comprising:

mounting a wheel alignment sensor to a wheel rim and tire assembly secured to said vehicle wheel hub assembly;

obtaining a first measurement of at least one alignment angle with said mounted wheel alignment sensor;

removing said wheel alignment sensor from said wheel rim and tire assembly;

removing said wheel rim and tire assembly from said vehicle wheel hub assembly;

mounting said wheel alignment sensor to said vehicle wheel hub assembly; and obtaining a wheel-off measurement of said at least one alignment angle with said mounted wheel alignment sensor;

obtaining at least one subsequent wheel-off measurement of said at least one alignment angle with said mounted wheel alignment sensor;

calculating an offset angle using said wheel-off measurement and said at least one subsequent wheel-off measurement, said offset angle representative of an angle alteration to said at least one alignment angle; and utilizing said calculated offset angle to determine a necessary alignment angle adjustment.

3. The method of claim 2 for measuring at least one vehicle wheel alignment angle from a vehicle wheel hub assembly wherein said utilizing step further includes compensating said first measurement by said calculated offset angle for display to an operator in such a manner so as to appear as if obtained by a wheel-mounted sensor.

4. The method of claim 2 for measuring at least one vehicle wheel alignment angle from a vehicle wheel hub assembly wherein said utilizing step further includes comparing said compensated first measurement with a predetermined specification value for said at least one alignment angle.

5. The method of claim 3 for measuring at least one vehicle wheel alignment angle from a vehicle wheel hub assembly wherein said utilizing step further includes subtracting said calculated offset angle from at least one predetermined specification value for said at least one alignment angle to compensate said specification value, wherein said first measurement of said at least one alignment angle may be compared with said compensated specification value to determine a necessary alignment angle adjustment.

6. A method for measuring at least one vehicle wheel alignment angle from a vehicle wheel hub assembly, comprising:

operatively coupling a wheel alignment sensor to a wheel rim and tire assembly secured to said vehicle wheel hub assembly;

obtaining a first measurement of at least one alignment angle with said mounted wheel alignment sensor;

removing said wheel alignment sensor from said wheel rim and tire assembly;

removing said wheel rim and tire assembly from said vehicle wheel hub assembly;

operatively coupling said wheel alignment sensor to said vehicle wheel hub assembly; and obtaining a second measurement of said at least one alignment angle with said mounted wheel alignment sensor;

calculating an offset angle representative of an angle variation between an angle measurement acquired by said sensor coupled to said wheel rim and tire assembly and an angle measurement acquired by said sensor coupled to said wheel hub assembly; and utilizing said calculated offset angle to present angle measurements acquired by said sensor coupled to said wheel hub assembly to an operator in such a manner so as to appear as if obtained by a sensor coupled to said wheel rim and tire assembly.

7. A method for adjusting at least one vehicle wheel alignment angle on a vehicle including a wheel rim and tire assembly secured to a wheel hub assembly, comprising:

operatively coupling a wheel alignment sensor to said wheel rim and tire assembly;

obtaining a first measurement of at least one alignment angle with said wheel alignment sensor coupled to said wheel rim and tire assembly;

removing said wheel alignment sensor from said wheel rim and tire assembly;

removing said wheel rim and tire assembly from said wheel hub assembly;

removably securing an adapter to said wheel hub assembly;

operatively coupling said wheel alignment sensor to said adapter;

obtaining a second measurement of said at least one alignment angle with said wheel alignment sensor coupled to said adapter prior to adjusting said at least one alignment angle;

calculating an offset angle between said first measurement and said second measurement;

utilizing said offset angle with said second measurement and any subsequent measurements of said at least one alignment angle obtained by said wheel alignment sensor coupled to said adapter to obtain a current representative measurement of said vehicle wheel alignment angle; and utilizing said current representative measurement of said vehicle wheel alignment angle to facilitate guiding an operator in adjusting said at least one alignment angle.

8. A method for adjusting at least one vehicle wheel alignment angle on a vehicle including a wheel rim and tire assembly secured to a wheel hub assembly, comprising:

operatively coupling a wheel alignment sensor to said wheel rim and tire assembly;

obtaining a first measurement of at least one alignment angle with said alignment sensor coupled to said wheel rim and tire assembly;

removing said wheel alignment sensor from said wheel rim and tire assembly;

removing said wheel rim and tire assembly from said wheel hub assembly;

operatively coupling said wheel alignment sensor to said wheel hub assembly;

obtaining a second measurement of said at least one alignment angle with said alignment sensor coupled to said wheel hub assembly;

calculating an offset angle between said first measurement and said second measurement;

utilizing said offset angle to obtain a corrected measurement for said at least one alignment angle; and comparing a predetermined specification value for said at least one alignment angle with said corrected measurement for said at least one alignment angle to identify a necessary alignment angle adjustment required to alter said alignment angle.

* * * * *